(12) United States Patent
Shamshoum et al.

(10) Patent No.: US 7,256,247 B2
(45) Date of Patent: Aug. 14, 2007

(54) POLYMERIZATION OF POLYETHYLENE HAVING HIGH MOLECULAR WEIGHT

(75) Inventors: Edwar S. Shamshoum, Gibsonia, PA (US); Luc Haspeslagh, Dilbeek (BE); Hong Chen, Alpharetta, GA (US)

(73) Assignee: Fina Technology, Inc., Houston, TX (US)

( * ) Notice: Subject to any disclaimer, the term of this patent is extended or adjusted under 35 U.S.C. 154(b) by 298 days.

(21) Appl. No.: 10/793,027

(22) Filed: Mar. 4, 2004
(Under 37 CFR 1.47)

(65) Prior Publication Data

US 2006/0142508 A1    Jun. 29, 2006

Related U.S. Application Data

(62) Division of application No. 10/196,614, filed on Jul. 16, 2002, now Pat. No. 6,730,751.

(51) Int. Cl.
*C08F 4/42* (2006.01)
*C08F 110/02* (2006.01)

(52) U.S. Cl. .................... 526/352; 526/160; 526/943; 526/124.2; 526/124.3

(58) Field of Classification Search ............... 526/160, 526/943, 124.2, 352, 124.3
See application file for complete search history.

(56) References Cited

U.S. PATENT DOCUMENTS 5,442,019 A * 8/1995 Agapiou et al. .............. 526/82

\* cited by examiner

*Primary Examiner*—Ling-Sui Choi
(74) *Attorney, Agent, or Firm*—Shirley A. Kopecky (57) ABSTRACT

The present invention includes a bimodal polyethylene polymerization process wherein metallocene catalyst to is used to adjust the hydrogen response of a Ziegler-Natta catalyst. The polymerization may be carried out in a single reactor or in two or more reactors in series, preferably two or more continuously stirred tank reactors in series. In an embodiment having two or more reactors, the Zeigler-Natta catalyst is added to a first reactor and the metallocene catalyst is added to a downstream reactor. In another embodiment having two or more reactors, the Zeigler-Natta catalyst and metallocene catalyst are added to the same reactor, preferably an upstream reactor. A preferred Zeigler-Natta catalyst comprises $TiCl_4$, and a preferred metallocene catalyst comprises bis(cyclopentadienyl) titanium dichloride.

17 Claims, 8 Drawing Sheets

FIG. 1

| | |
|---|---|
| Mn | 30750 |
| Mw | 215674 |
| Mz | 1128283 |
| Mp | 66562 |
| D | 7.0 |
| D' | 5.2 |
| A | 3321 |

| | |
|---|---|
| Mn | 18329 |
| Mw | 30716 |
| Mz | 324378 |
| Mp | 52129 |
| D | 7.1 |
| D' | 6.3 |
| A | 3126 |

FIG. 8

| | |
|---|---:|
| Mn | 15832 |
| Mw | 100401 |
| Mz | 608116 |
| Mp | 35037 |
| D | 6.3 |
| D' | 6.1 |
| A | 3166 |

POLYMERIZATION OF POLYETHYLENE HAVING HIGH MOLECULAR WEIGHT

CROSS-REFERENCE TO RELATED APPLICATIONS

This application is a divisional of application Ser. No. 10/196,614, filed Jul. 16, 2002, now U.S. Pat. No. 6,730,751.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the use of Zeigler-Natta and metallocene catalysts in a polymerization process to produce high density polyethylene (HDPE), and more particularly to the use of a metallocene catalyst to adjust the hydrogen response of a Zeigler-Natta catalyst in the production of HDPE preferably having bimodal physical properties.

BACKGROUND OF THE INVENTION

Bimodal HDPE comprises a low molecular weight (LMW) fraction and a high molecular weight fraction (HMW), typically referred to as a bimodal molecular weight distribution (MWD). Bimodal HDPE combines the advantages of low molecular weight polyethylene such as ease of processing and high melt flow index with the physical property advantages of high molecular weight polyethylene such as good impact resistance and good slow crack growth resistance. In making bimodal HDPE, the relative proportion of the low and high molecular weight fractions may be adjusted (as measured by the MWD) to provide HDPE having desired physical properties. For example, broadening the MWD of an HDPE polymer typically tends to improve the shear response of the polymer, thereby improving processing behavior in extrusion processes (such as in blown film, sheet, pipe and blow molding equipment).

The MWD may be determined by means of a curve obtained by gel permeation chromatography (GPC). For a polymer having a bimodal MWD, the GPC curve may resemble a peaked bell curve having a "shoulder" on the high molecular weight side of the peak or by two distinct peaks. Generally, the MWD is defined by a parameter known as the polydispersity index (D), which is the ratio between the average molecular weight by weight (Mw) and the average molecular weight by number (Mn), i.e., D=Mw/Mn. The polydispersity index (D) provides a measure of the width of the molecular weight distribution for a polymer composition.

Bimodal HDPE is typically produced in a multi-stage polymerization process, for example polymerization of the low molecular weight fraction in a first stage and polymerization of the high molecular weight fraction in a second stage (or it can be the reverse). The multi-stage polymerization may be carried out in a single reactor or in two or more reactors in series, and suitable reactor types include stirred tanks, loop reactors, gas phase reactors, tubular reactors, autoclaves, and combinations thereof. Differing polymerization conditions may be achieved in the stages by varying parameters such as the reaction conditions (e.g., time, temperature, pressure, etc.) and the type and amount of reactants (e.g., monomer, co-monomers), catalysts, cocatalysts, chain transfer/termination agents (e.g., hydrogen), and the like.

Conventional, bimodal HDPE polymerization processes typically use one or more Zeigler-Natta catalysts wherein the production of low molecular weight and high molecular weight fractions is achieved by adjusting the hydrogen response of the Zeigler-Natta catalyst—an increase in hydrogen response producing a lower molecular weight polymer and conversely a decrease in hydrogen response producing a higher molecular weight polymer. More specifically, hydrogen serves as a chain termination agent for the Zeigler-Natta catalysts. Increasing the concentration of hydrogen in the polymerization reaction leads to increased termination of the polymer chains (i.e., shorter chain lengths), which produces a lower molecular weight polymer. Conversely, decreasing the concentration of hydrogen in a polymerization reaction leads to decreased termination of the polymer chains (i.e., longer chain lengths), which produces a higher molecular weight polymer. A common way of adjusting the hydrogen concentration (and thus the hydrogen response) in a conventional bimodal polymerization process is to vent hydrogen from a reactor, which wastes valuable reactants such as monomers and results in increased operating costs. The present invention provides an improved process for production of bimodal HDPE wherein the wasteful venting of hydrogen is substantially reduced or eliminated.

SUMMARY OF THE INVENTION

The present invention includes a bimodal polyethylene polymerization process wherein metallocene catalyst to is used to adjust the hydrogen response of a Ziegler-Natta catalyst. The polymerization may be carried out in a single reactor or in two or more reactors in series, preferably two or more continuously stirred tank reactors in series. In an embodiment having two or more reactors, the Zeigler-Natta catalyst is added to a first reactor (in this case the LMW reactor) and the metallocene catalyst is added to a downstream reactor. In another embodiment having two or more reactors, the Zeigler-Natta catalyst and metallocene catalyst are added to the same reactor, preferably an upstream reactor. In an embodiment, the Zeigler-Natta catalyst comprises $TiCl_4$ and the metallocene catalyst comprises bis (cyclopentadienyl) titanium dichloride.

According to another embodiment of the invention, a polyethylene polymerization process comprises (a) polymerizing polyethylene in the presence a Zeigler-Natta catalyst for a period of time, and (b) adding a metallocene catalyst and continuing the polymerization for an additional period of time. Preferably, the polymerization process produces polyethylene having a bimodal molecular weight distribution.

DESCRIPTION OF THE DRAWINGS

The invention, together with further advantages thereof, may best be understood by reference to the following description taken in conjunction with the accompanying drawing in which.

DETAILED DESCRIPTION OF THE INVENTION

In an embodiment of the present invention, polyethylene having a bimodal MWD is polymerized in a two-stage polymerization reaction. In the first stage, ethylene monomer is polymerized into polyethylene in the presence of a Zeigler-Natta catalyst such that the resulting polyethylene fraction is of relatively low molecular weight in comparison to the polyethylene fraction produced during the second stage. As discussed previously, hydrogen is used as a chain termination agent with the Zeigler-Natta catalyst to regulate the extent of polymerization occurring during the first stage. Polymerization reaction conditions such as temperature, pressure, and reaction time are selected and suitable such that the resulting polyethylene fraction displays the desired relatively low molecular weight.

Upon achieving a desired fraction of relatively low molecular weight polyethylene, the second stage of the polymerization reaction is carried out by using a metallocene catalyst to lower the hydrogen response of the Zeigler-Natta catalyst, whereby the polymerization reaction is continued to produce a polyethylene fraction having a relatively high molecular weight in comparison to the polyethylene fraction produced during the first stage. The amount of metallocene used is such that the mass ratio of metallocene catalyst to Zeigler-Natta catalyst (i.e., g metallocene/g Zeigler-Natta) is in the range of from about 0.1 to about 2.0, preferably from about 0.25 to about 1.5, more preferably about 0.5-1.0. During the second stage, additional ethylene monomer and/or a comonomer such as butene may be added to the polymerization reaction. In a continuous process, typically no additional hydrogen is added during the second stage, as increased hydrogen concentration is generally detrimental to producing higher molecular weight polyethylene, as noted above. Polymerization reaction conditions such as temperature and residence time are selected and suitable such that the resulting polyethylene fraction displays the desired relatively high molecular weight and the resulting polyethylene product displays the desired bimodal MWD. Upon completion of the polymerization reaction, the polyethylene product is recovered.

The resulting polyethylene produced according to the present invention is HDPE having a bimodal MWD in the range of from about 10 to about 35 and more preferably from about 15 to about 30 and melt flow index (MI5) in the LMW reactor in the range of from about 100 to about 3000 dg/min, more preferably from about 250 to about 2000 dg/min, and most preferably from about 400 to about 1500 dg/min. In the HMW reactor the melt flow index is in the range of from about 0.1 to about 10 dg/min, more preferably from about 0.2 to about 5 dg/min, and most preferably from about 0.3 to about 2.0 dg/min. The final density of the bimodal polyethylene is in the range of from about 0.930 to about 0.970 g/cc, more preferably in the range of from about 0.940 to about 0.965 g/cc, and most preferably from about 0.945 to about 0.960 g/cc. HDPE produced in accordance with this invention is useful, for example, in extrusion and molding processes to produce a variety of end use products such as fibers, webs (both woven and nonwoven), films (both blown and cast), pipe, containers, component parts, and the like.

The polymerization process of the present invention may be performed either batch wise or continuously. The polymerization process may be conducted in a single reactor, as described in the Examples below, or preferably is conducted in two or more reactors connected in series, more preferably as a continuous process conducted in two continuously stirred tank reactors connected in series. In a single reactor, preferably the Zeigler-Natta catalyst is added to the reactor during the first stage, and the metallocene catalyst is added to the reactor during the second stage. Alternatively, the Zeigler-Natta catalyst and metallocene catalyst may be added simultaneously during the first stage, with the hydrogen response of the Zeigler-Natta catalyst decreasing as the reaction proceeds to the second stage. With two or more reactors connected in series, and more specifically with two continuously stirred tank reactors connected in series and operating continuously, the Zeigler-Natta catalyst is preferably added to the first (i.e., upstream) reactor wherein the first stage polymerization is performed, and the metallocene catalyst is added to the second (i.e., downstream) reactor wherein the second stage polymerization is performed. Optionally, reactants may be recycled from the second reactor to the first, in which case metallocene catalyst will be introduced into the first reactor regardless of where virgin metallocene is initially added to the reactor system. Alternatively, the Zeigler-Natta catalyst and metallocene catalyst can be added simultaneously to the upstream reactor, with the hydrogen response of the Zeigler-Natta catalyst decreasing as the catalyst travels to the second reactor. Where added simultaneously, preferably the Zeigler-Natta and metallocene catalysts are premixed and injected into the reactor together. The catalysts, and preferably the Zeigler-Natta catalyst, may be prepolymerized to improve the performance of the catalysts prior to being added to the reactors as described above. Generally, prepolymerization is carried out by contacting a small amount of monomer with the catalyst after the catalyst has been activated, for example for example in pre-polymerization reactor located upstream of the first reactor.

Any conventional Zeigler-Natta catalyst and mixtures thereof (hereafter may also be referred to as "Ziegler-Natta catalysts" or "Ziegler-Natta catalysts systems") suitable for polymerizing polyethylene homopolymers and/or copolymers may used in performing the present invention. Ziegler-Natta catalysts systems may include a conventional Ziegler-Natta catalyst, a support, one- or more internal donors, and one or more external donors. Conventional Ziegler-Natta catalysts typically comprise a transition metal compound (or mixtures thereof) that may be described by the general formula:

$$MR^+_x$$

where M is a transition metal, $R^+$ is a halogen or a hydrocarboxyl, and x is the valence of the transition metal. Preferably, M is a group IVB metal, more preferably titanium, chromium or vanadium, and most preferably titanium. Preferably, $R^+$ is chlorine, bromine, or an alkoxy, more preferably chlorine or an ethoxy, and most preferably chlorine. Preferred transition metal compounds are $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, $Ti(OC_{12}H_{25})Cl_3$, and combinations thereof, and most preferably titanium tetrachloride ($TiCl_4$). No restriction on the number of transition metal compounds is made so long as at least one transition metal compound is present. The transition metal compound is typically supported on an inert solid such as a metal hydride and/or metal alkyl, preferably a magnesium compound such as magnesium halides, dialkoxymagnesiums, alkoxymagnesium halides, magnesium oxyhalides, dialkylmagnesiums, magnesium oxide, magnesium hydroxide, magnesium carboxylates, and more preferably magnesium dichloride or magnesium dibromide. Typical magnesium levels are from about 12% to about 20% by weight of catalyst. Silica may also be used as a support. The supported Zeigler-Natta catalyst may be employed in conjunction with a co-catalyst, preferably an organoaluminum compound; more preferably an alkylaluminum compound of the formula AlR^3 where R^ is an alkyl having 1-8 carbon atoms and each R^ being the same or different, for example, triethylaluminum (TEAl), trimethyl aluminum (TMA) and triisobutyl aluminum (TiBAL); and most preferably TEAl. Suitable conventional Ziegler-Natta catalysts are disclosed in, for example, U.S. Pat. No. 4,701,432 (in particular, see column 5 line 27 to column 6 line 5); U.S. Pat. No. 4,987,200 (in particular, see column 27 line 22 to column 28 line 17); U.S. Pat. Nos. 3,687,920; 4,086,408; 4,376,191; 5,019,633; 4,482,687; 4,101,445; 4,560,671; 4,719,193; 4,755,495; and 5,070,055, each of which is incorporated by reference herein in its entirety.

Conventional Ziegler-Natta catalysts may be used in conjunction with one or more internal electron donors. These internal electron donors are added during the preparation of the catalysts and may be combined with the support or otherwise complexed with the transition metal halide. A suitable Ziegler-Natta catalyst containing a diether-based internal donor compound is that available as Mitsui RK-100 and Mitsui RH-220, both manufactured by Mitsui Chemicals, Inc., Japan. The RK-100 catalyst additionally includes an internal phthalate donor.

Conventional Ziegler-Natta catalysts may also be used in conjunction with one or more external donors. Generally such external donors act as stereoselective control agents to control the amount of atactic or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, may reduce catalyst activity and may tend to reduce the melt flow of the resulting polymer.

Any metallocene catalyst or mixtures thereof hereafter may also be referred to as "metallocenes", "metallocene compounds", or "metallocene catalysts systems") suitable for polymerizing polyethylene homopolymers and/or copolymers may used in performing the present invention. Metallocenes can be characterized generally as coordination compounds incorporating one or more cyclopentadienyl (Cp) groups (which may be substituted or unsubstituted and may be the same or different) coordinated with a transition metal through Π bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures may also be substituted or unsubstituted by hydrocarbyl radicals and desirably C1-C20 hydrocarbyl radicals. Metallocene compounds may be combined with an activator and/or cocatalyst (as described in greater detail below) or the reaction product of an activator and/or cocatalyst, such as for example methylaluminoxane (MAO) and optionally an alkylation/scavenging agent such as trialkylaluminum compound (TEAl or optionally TiBAl). Various types of metallocenes are known in the art that may be supported. Typical support may be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30-600 microns, desirably from 30-100 microns, a surface area of 50-1,000 square meters per gram, desirably from 100-400 square meters per gram, a pore volume of 0.5-3.5 cc/g, desirably from about 0.5-2 cc/g.

As used herein unless otherwise indicated, "metallocene" includes a single metallocene composition or two or more metallocene compositions. Metallocenes are typically bulky ligand transition metal compounds generally represented by the formula:

$$[L]_m M[A]_n$$

where L is a bulky ligand, A is a leaving group, M is a transition metal and m and n are such that the total ligand valency corresponds to the transition metal valency.

The ligands L and A may be bridged to each other, and if two ligands L and/or A are present, they may be bridged. The metallocene compounds may be a full-sandwich compounds having two or more ligands L which may be cyclopentadienyl ligands or cyclopentadiene derived ligands or half-sandwich compounds having one ligand L, which is a cyclopentadienyl ligand or cyclopentadienyl derived ligand. The transition metal atom may be a Group 4, 5, or 6 transition metal and/or a metal from the lanthanide and actinide series. Zirconium, titanium, and hafnium are desirable. Other ligands may be bonded to the transition metal, such as a leaving group, such as but not limited to hydrocarbyl, hydrogen or any other univalent anionic ligand.

Preferred metallocenes are unbridged metallocenes that may be described by the general formula:

$$Cp_2 M'Q_n$$

where Cp is a cyclopentadienyl group, each being the same or different and which may be substituted or unsubstituted; M' is a transition metal; and Q is a halogen, an alkyl, or hydrocarbyl having from 1-20 carbon atoms; and n+2 equals the valence of the transition metal. Preferably M' is a group IVB metal, more preferably zirconium or titanium, and most preferably titanium, which has a valence of 4. Preferably, Q is a halogen or alkyl, more preferably chlorine or methyl, and most preferably chlorine. A preferred unbridged metallocene is bis (cyclopentadienyl) titanium dichloride, also referred to as titanocene dichloride.

A bridged metallocene, for example, may be described by the general formula:

$$RCpCp'MeQn.$$

where Me is a transition metal element; Cp and Cp' each is a cyclopentadienyl group, each being the same or different and which can be either substituted or unsubstituted; Q is an alkyl or other hydrocarbyl or a halogen group; n is a number and may be within the range of 1-3; and R is a structural bridge extending between the cyclopentadienyl rings. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614; 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341; and EP 549 900; 576 970; and 611 773; and WO 97/32906; 98/014585; 98/22486; and 00/12565, each of which is incorporated by reference herein in its entirety.

Metallocenes may be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units and may be described by the general formulas:

where R is a $C_1$-$C_8$ alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each incorporated herein by reference.

Ionizing activators may also be used to activate metallocenes. These activators are neutral or ionic, or are compounds such as tri(n-butyl)ammonium tetrakis(pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations. Suitable ionic activators are disclosed in, for example, WO 94/07928, EP-A-0 277 003, EP-A-0 277 004, U.S. Pat. No. 5,198,401, WO-A-92/00333, EP-A-0 426 637, EP-A-0 573 403, EP-A-0 520 732, EP-A-0 495 375, EP-A-O 500 944, EP-A1-0 570, U.S. Pat. No. 5,643, 847, U.S. patent application Ser. No. 09,184,358, filed Nov. 2, 1998 and U.S. patent application Ser. No. 09,184,389, filed Nov. 2, 1998, all fully incorporated herein by reference.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner. The following is a summary of the polymerization conditions used in the examples:

| | |
|---|---|
| wt. of ZN catalyst: | 10 mg |
| wt. of metallocene: | 0, 3, 5, or 10 mg |
| amount of TEA1 (co-catalyst): | 0.25 mmole/l |
| Hydrogen: | 2, 4, 6 or 8 SLPM |
| Ethylene: | 4 or 8 SLPM |
| Temp.: | 80° C. |
| Time: | 120 minutes |
| Pressure | 125 psi |

The Autoclave Engineer reactor used for these polymerizations of ethylene has a four liter capacity and is fitted with four mixing baffles with two opposed pitch mixing propellers. Ethylene and hydrogen are introduced to the reactor vessel via Teledyne-Hastings Raydist mass flow controllers while a downloaded backpressure regulator kept the internal reaction pressure constant. The reaction temperature is maintained by steam and cold water in the reactor jacket using a Kammer Valve linked to a Barber-Coleman controller.

Example 1

The reactor was filled with 2 liters of hexene and the temperature was increased to 80° C. with agitation. 10 mg of a typical Zeigler-Natta catalyst was suspended in mineral oil and precontacted with 2 ml TEA1 solution (0.25 mmole/1 in hexene) in a dry box. Hydrogen and ethylene were admitted to the reactor at the flow rates of 2 standard liters per minute (SLPM) and 8 SLPM, respectively, and the reactor backpressure was maintained at 125 psi. The ZN catalyst-cocatalyst mixture was charged into the reactor. The reactor temperature and pressure were maintained for one hour. After one hour of polymerization, 3 mg of a metallocene catalyst, specifically titanocene dichloride, were charged into the reactor and polymerization was continued for another hour under the same reactor temperature and pressure. After transferring the polymer fluff slurry from the reactor to a flask, the solvent was removed and the polymer was collected as dry fluff.

Example 2

The procedure of Example 1 was followed except that 5 mg of titanocene dichloride were charged into the reactor.

Example 3

The procedure of Example 1 was followed except that 10 mg of titanocene dichloride were charged into the reactor.

Comparative Example 1

The procedure of Example 1 was followed except no titanocene dichloride was charged into the reactor.

Example 4

The procedure of Example 1 was followed except that the hydrogen and ethylene flow rates were at 4 SLPM and 8 SLPM, respectively.

Example 5

The procedure of Example 4 was followed except that 10 mg of titanocene dichloride were charged into the reactor.

Comparative Example 2

The procedure of Example 4 was followed except no titanocene dichloride was charged into the reactor.

Example 6

The procedure of Example 1 was followed except that the hydrogen and ethylene flow rates were at 6 SLPM and 8 SLPM, respectively.

Example 7

Figure 1:
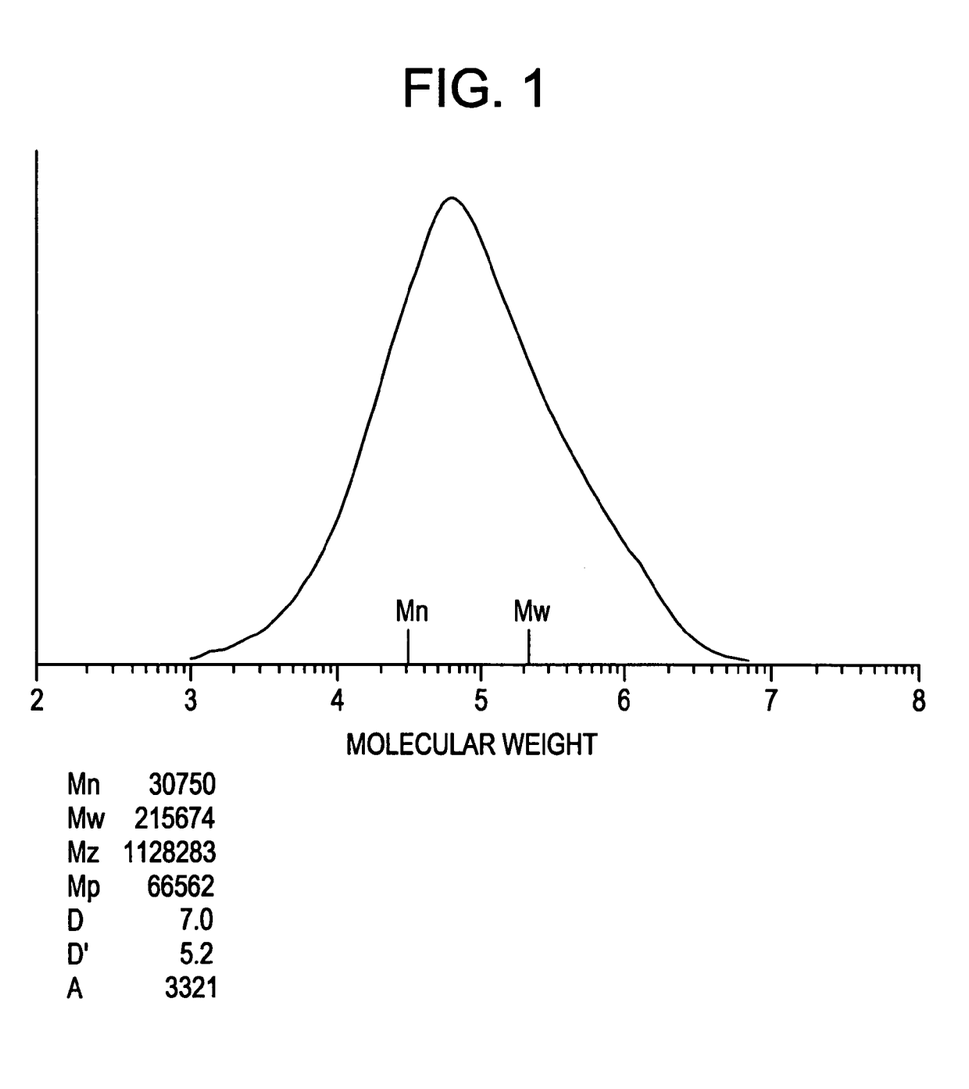
FIGS. 1-7 are GPC curves for the polymer produced in Examples 1-7, respectively.
Figure 2:
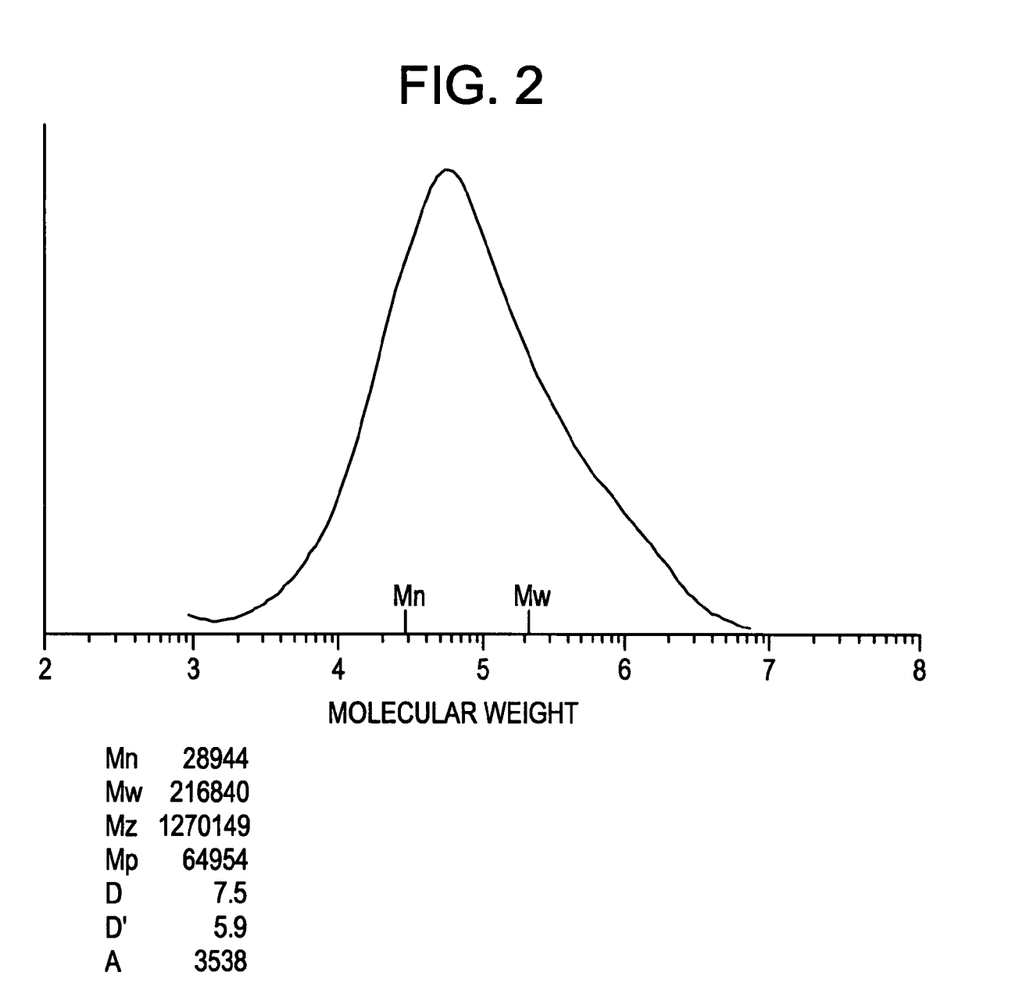
Figure 3:
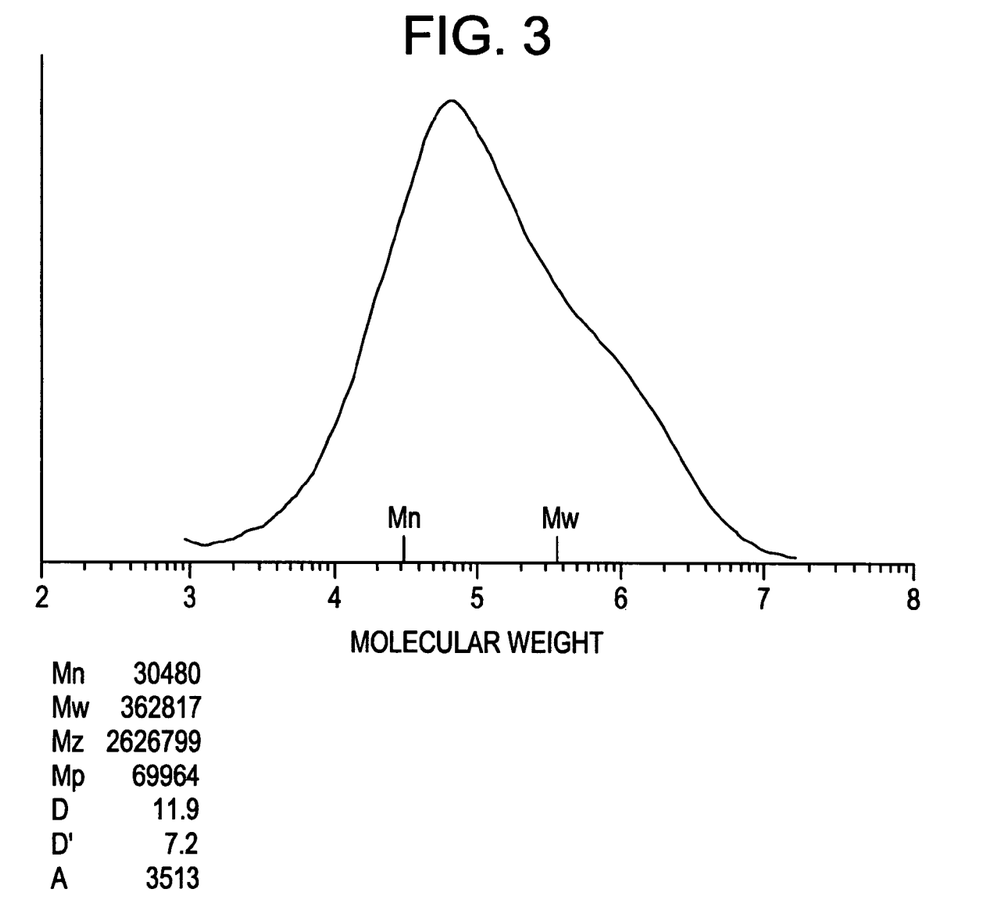
Figure 4:
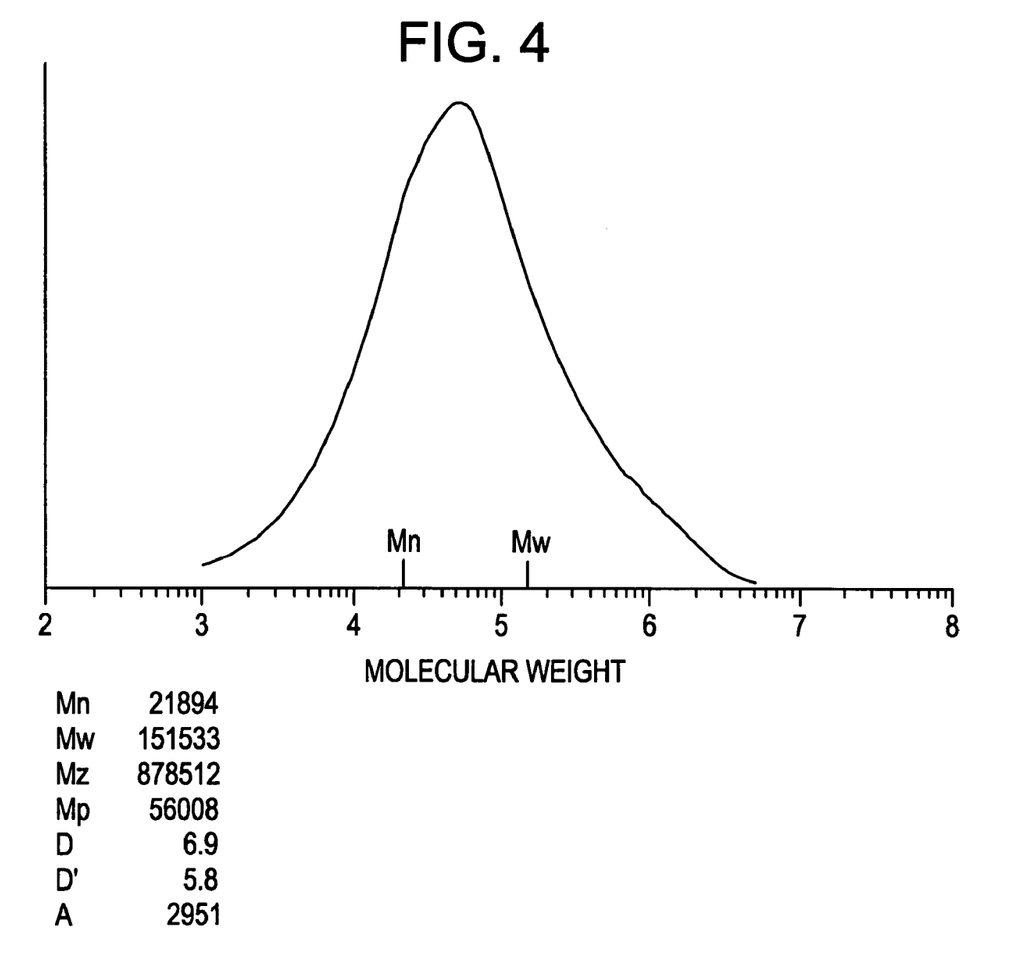
Figure 5:
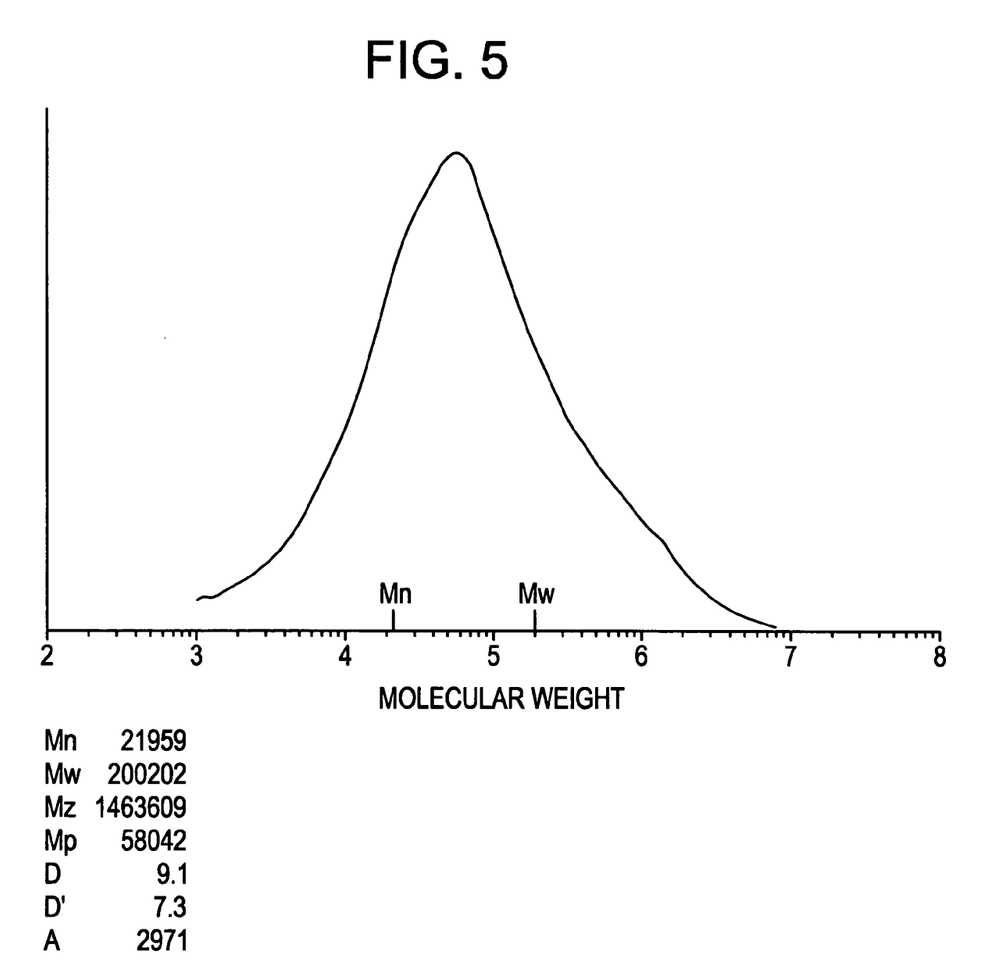
Figure 6:
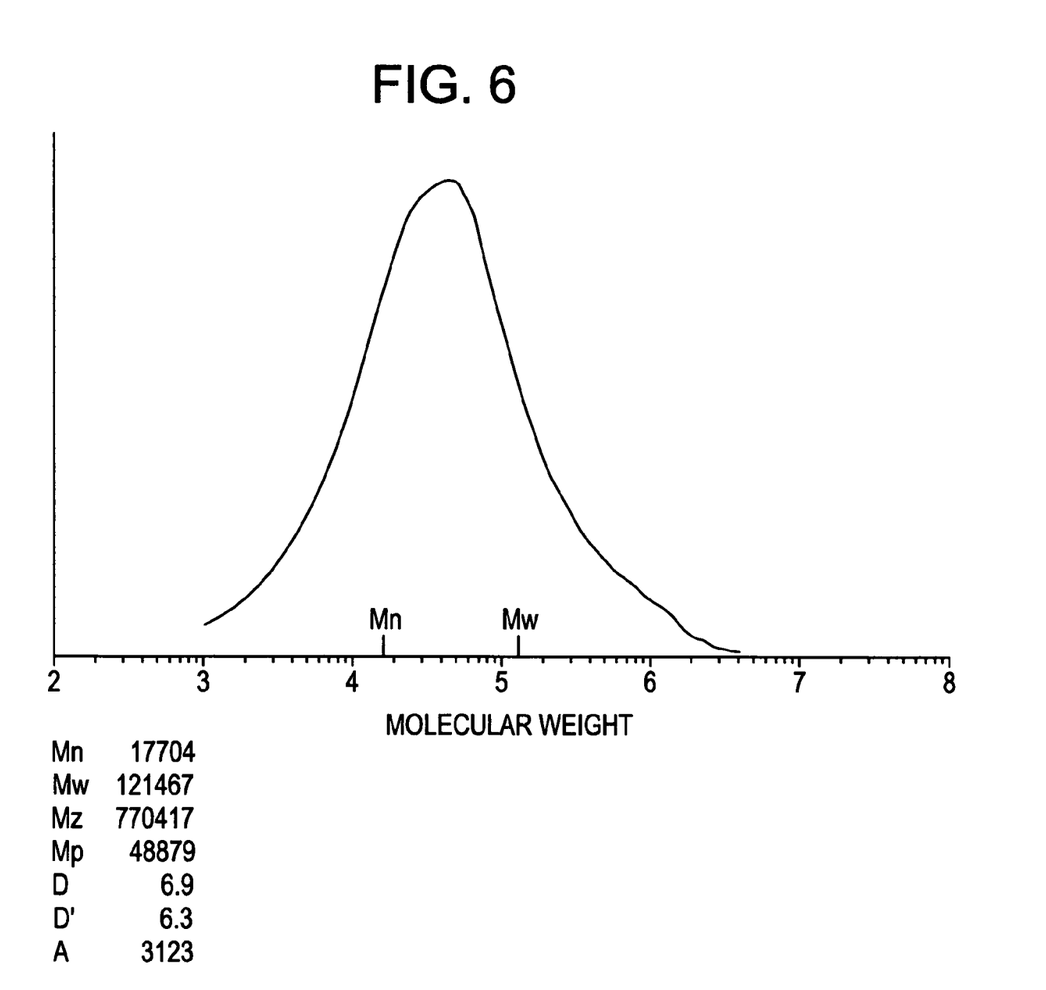
Figure 7:
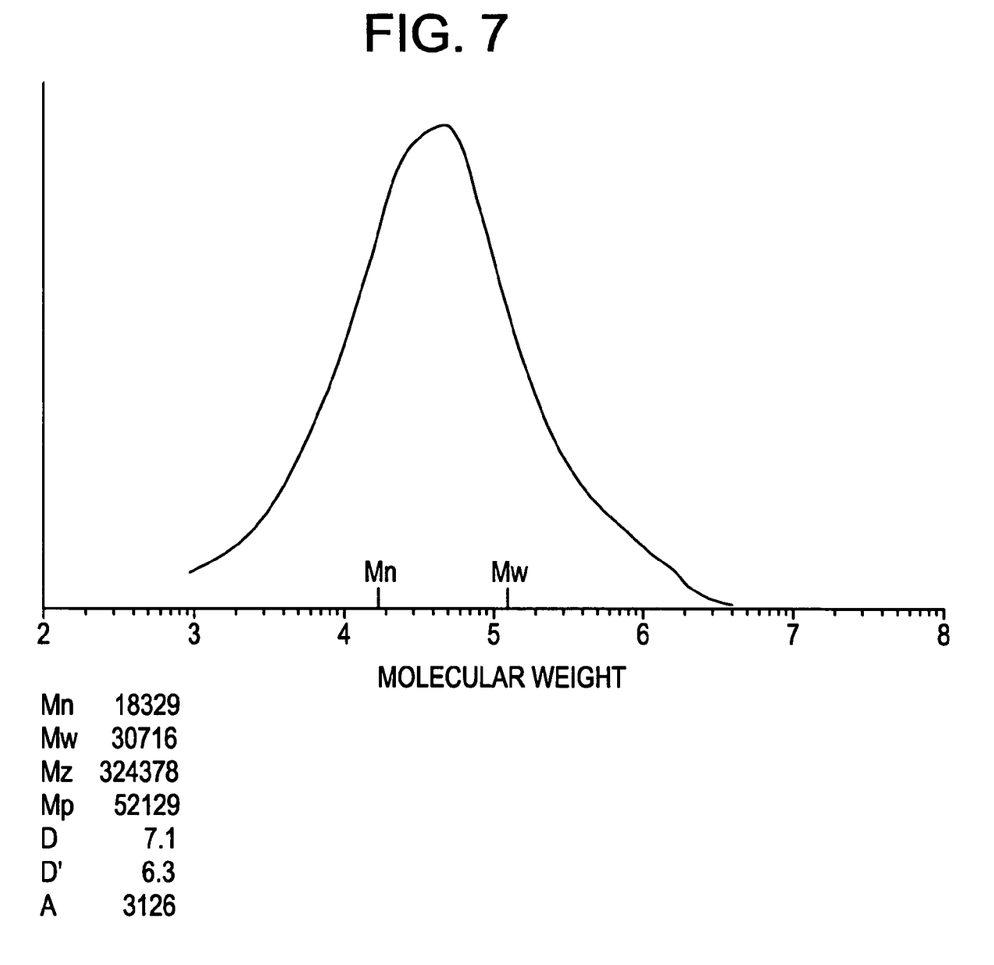
Figure 8:
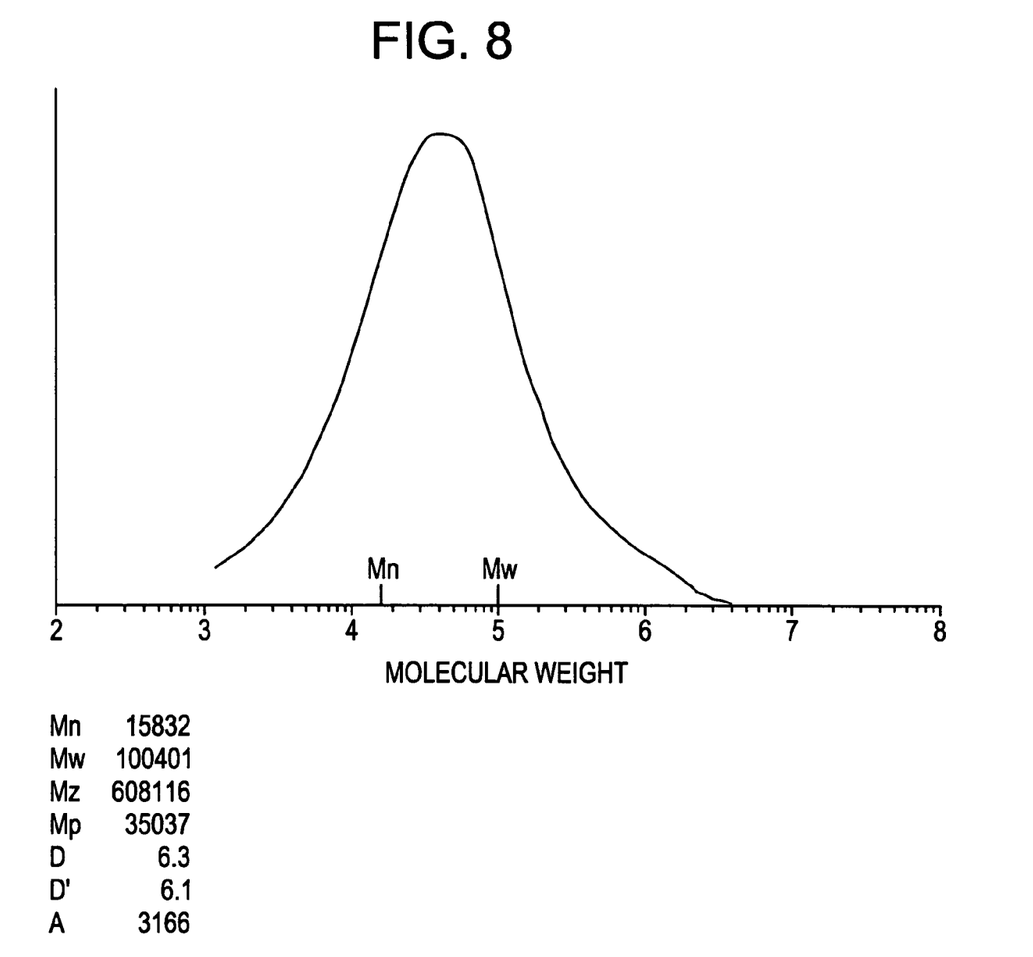
FIG. 8 is a GPC curve for the polymer produced in Comparative Example 2.

The procedure of Example 6 was followed except that 10 mg of titanocene dichloride were charged into the reactor.

weight, and enhanced melt strength. FIGS. 1-7 are GPC curves for the polymer produced in Examples 1-7, respectively. FIG. 8 is a GPC curve for the polymer produced in Comparative Example 2.

While the preferred embodiments and examples of the invention have been shown and described, modifications thereof can be made by one skilled in the art without departing from the spirit and teachings of the invention. Reactor design criteria, pendant polymer processing equipment, and the like for any given implementation of the invention will be readily ascertainable to one of skill in the art based upon the disclosure herein. The embodiments and examples described herein are provided for illustration and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

TABLE I

| EXAMPLE | M:Z-N (w/w) | H2/C2 | Yield | MI5 | HLMI | HLMI/MI5 | Mn | Mw | Mz | Mw/Mn | Mz/Mw |
|---|---|---|---|---|---|---|---|---|---|---|---|
| 1 | 0.3 | 0.25 | 224 | 0.427 | 5.38 | 12.60 | 30750 | 215674 | 1128283 | 7.0 | 5.2 |
| 2 | 0.5 | 0.25 | 321 | 0.673 | 8.36 | 12.42 | 28944 | 216840 | 1270149 | 7.5 | 5.9 |
| 3 | 1 | 0.25 | 335 | 0.111 | 2.36 | 21.26 | 30480 | 362817 | 2626799 | 11.9 | 7.2 |
| Comparative 1 | 0 | 0.25 | 273 | 1.58 | 19.21 | 12.16 | 25551 | 168429 | 925964 | 6.6 | 5.5 |
| 4 | 0.3 | 0.5 | 209 | 2.33 | 27.79 | 11.93 | 21894 | 151633 | 878512 | 6.9 | 5.8 |
| 5 | 1 | 0.5 | 149 | 0.637 | 8.55 | 13.42 | 21959 | 200202 | 1463609 | 9.1 | 7.3 |
| Comparative 2 | 0 | 0.5 | 186 | 5.62 | 49.82 | 8.86 | 17653 | 124943 | 796964 | 7.1 | 6.4 |
| 6 | 0.3 | 0.75 | 111 | 5.81 | 88.94 | 15.31 | 17704 | 121467 | 770417 | 6.9 | 6.3 |
| 7 | 1 | 0.75 | 148 | 4.56 | 50.52 | 11.08 | 18329 | 130716 | 824378 | 7.1 | 6.3 |
| Comparative 3 | 0 | 0.75 | 115 | 9.66 | 108.2 | 11.20 | 15832 | 100401 | 608116 | 6.3 | 6.1 |
| 8 | 0.5 | 2.0 | 47 | 115 | — | — | 9226 | 61656 | 616100 | 6.7 | 10.0 |
| 9 | 1 | 2.0 | 53 | 120.9 | — | — | 9015 | 59731 | 574208 | 6.6 | 9.6 |
| Comparative 4 | 0 | 2.0 | 49 | 65.95 | — | — | 11394 | 61840 | 374153 | 5.4 | 6.1 |

Comparative Example 3

The procedure of Example 6 was followed except no titanocene dichloride was charged into the reactor.

Example 8

The procedure of Example 1 was followed except that the hydrogen and ethylene flow rates were at 16 SLPM and 8 SLPM, respectively, and 5 mg of titanocene dichloride were charged into the reactor.

Example 9

The procedure of Example 8 was followed except that 10 mg of titanocene dichloride were charged into the reactor.

Comparative Example 4

The procedure of Example 8 was followed except no titanocene dichloride was charged into the reactor.

Table I shows the effect of the addition of metallocene compound on a conventional supported Ziegler-Natta catalyst with TEAl only as a co-catalyst, wherein M:Z-N is the weight ratio of metallocene catalyst to Ziegler-Natta catalyst and yield is polymer yield in grams. The data demonstrates that such use of a metallocene catalyst with a Ziegler-Natta catalyst yields bimodal polyethylene with broader molecular weight distribution, decreased melt index, higher molecular

What is claimed is:

1. A polymer produced using a polyethylene two-stage polymerization process, comprising:
   (a) polymerizing ethylene in the presence a Zeigler-Natta catalyst and a co-catalyst for a period of time to produce a lower molecular weight polyethylene with a melt flow index (MI5) of from 100 to 3000 dg/min;
   (b) adding a metallocene component and continuing the polymerization for an additional period of time to produce a higher molecular weight polyethylene with a melt flow index (MI5) of from greater than 0.2 to 10 dg/min, wherein the addition of the metallocene component adjusts the hydrogen response of the Zeigler-Natta catalyst;
   wherein the polymerization process produces high-density polyethylene with a bimodal molecular weight distribution of from 10 to 35 and wherein said bimodal polyethylene has a density of from greater than 0.930 to about 0.970 g/cc.

2. An article of manufacture comprised of the polymer of claim 1.

3. The polymer of claim 1 wherein step (a) is performed in a first reactor vessel, and step (b) is performed in a second, downstream reactor vessel.

4. The polymer of claim 3 wherein the reactor vessels are continuously stirred tank reactors.

5. The polymer of claim 1 wherein step (a) and step (b) are performed in a single reactor vessel.

6. The polymer of claim 1 where said co-catalyst has a formula of:

$$AlR\char`\^3$$

where Al is aluminum, and $R\char`\^$ is an alkyl having 1-8 carbon atoms with each $R\char`\^$ being the same or different.

7. The polymer of claim 5 wherein said co-catalyst is selected from the group consisting essentially of triethylaluminum (TEAl), trimethyl aluminum (TMA), triisobutyl aluminum (TiBAL), or a combination thereof.

8. The polymer of claim 1 wherein the higher molecular weight polyethylene has a melt flow index (MI5) of from greater than 0.2 to 5 dg/min.

9. The polymer of claim 1 wherein a mass ratio of the metallocene compound to the Ziegler-Natta catalyst is about 0.1-0.5:1.

10. The polymer of claim 1 wherein the metallocene compound is generally represented by the formula:

$$Cp_{2}M'Q_{n}$$

where Cp is a cyclopentadienyl group, each being the same or different and which may be substituted or unsubstituted; M' is a group (IV)B metal; and Q is a halogen, an alkyl, or hydrocarboxyl; and n+2 equals the valence of the transition metal.

11. The polymer of claim 10 further comprised of a metallocene activator.

12. The polymer of claim 1 wherein the metallocene compound comprises bis(cyclopentadienyl) titanium dichloride.

13. The polymer of claim 1 wherein the Zeigler-Natta catalyst comprises a transition metal compound generally represented by the formula:

$$MR^{+}_{x}$$

where M is a transition metal, $R^+$ is a halogen or a hydrocarboxyl, and x is the valence of the transition metal.

14. The polymer of claim 13 wherein M is a group (IV)B metal, and $R^+$ is chlorine, bromine, or alkoxy.

15. The polymer of claim 13 wherein M is titanium, and $R^+$ is chlorine or ethoxy.

16. The polymer of claim 13 wherein the transition metal compound is $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, or $Ti(OC_{12}H_{25})Cl_3$.

17. A polymer produced using a polyethylene two-stage polymerization process, comprising:
(a) polymerizing ethylene in the presence a Zeigler-Natta catalyst and a co-catalyst for a period of time to produce a lower molecular weight polyethylene with a melt flow index (MI5) of from 100 to 3000 dg/min;
(b) adding a metallocene component and continuing the polymerization for an additional period of time to produce a higher molecular weight polyethylene with a melt flow index (MI5) of from greater than 0.2 to 10 dg/min, wherein the addition of the metallocene component adjusts the hydrogen response of the Zeigler-Natta catalyst;
wherein the polymerization process produces high-density polyethylene with a bimodal molecular weight distribution of from 10 to 35 and wherein said bimodal polyethylene has a density of from greater than 0.930 to about 0.970 g/cc.

* * * * *